United States Patent [19]
Delin et al.

[11] Patent Number: 5,235,898
[45] Date of Patent: Aug. 17, 1993

[54] ACTUATOR WITH WEAR COMPENSATING CHAMBER

[75] Inventors: Claude Delin, Pantin; Claude Ledamoisel, Bessancourt; Robert Michel, Mery-sur-Oise; Vévé R. Randriazanamparany, Rueil-Malmaison, all of France

[73] Assignee: Valeo, Paris, Cedex, France

[21] Appl. No.: 803,555

[22] Filed: Dec. 9, 1991

[30] Foreign Application Priority Data
Dec. 7, 1990 [FR] France .................. 90 15359

[51] Int. Cl.[5] .................. F15B 11/00; F15B 13/00
[52] U.S. Cl. .................. 91/519; 91/508; 91/534; 91/535; 192/111 A
[58] Field of Search .................. 91/508, 513, 519, 534, 91/535; 192/111 A, 70.25; 188/196 A, 196 R

[56] References Cited

U.S. PATENT DOCUMENTS

| | | | |
|---|---|---|---|
| 2,282,556 | 5/1942 | Bowen .................. | 91/535 X |
| 4,671,400 | 6/1987 | Grunberg et al. .................. | 192/111 A |

FOREIGN PATENT DOCUMENTS

| | | | |
|---|---|---|---|
| 0386330 | 9/1990 | European Pat. Off. . | |
| 2124948 | 11/1972 | Fed. Rep. of Germany . | |
| 2136847 | 12/1972 | France . | |
| 2612464 | 9/1988 | France . | |
| 45-34525 | 3/1968 | Japan .................. | 192/111 A |
| 45-38284 | 10/1968 | Japan .................. | 192/111 A |
| 45-41161 | 11/1968 | Japan .................. | 192/111 A |
| 47-33308 | 2/1970 | Japan .................. | 192/111 A |
| 1434189 | 10/1988 | U.S.S.R. .................. | 188/196 A |

Primary Examiner—Edward K. Look
Assistant Examiner—John Ryznic
Attorney, Agent, or Firm—Longacre & White

[57] ABSTRACT

An actuator for a friction clutch having a diaphragm includes coupling means comprising a first part associated with the clutch actuating linkage, and a second part associated with the actuator proper. The actuator, of the fluid operated type, comprises a main piston working in a main cylinder and defining with it a control chamber. A secondary piston works within the hollow bore of the main piston to define within the latter a wear compensating chamber. The main piston carries a shut-off valve for bringing the control chamber and the wear compensation chamber into communication with each other when the clutch is in its engaged position. The actuator also includes a booster spring for applying additional force to the diaphragm, such that the characteristic of the diaphragm has a positive gradient over the whole travel between the engaged and disengaged positions of the clutch. The booster spring is brought into operation by a loose coupled driving means between the booster spring and the sub-assembly of the two pistons.

9 Claims, 5 Drawing Sheets

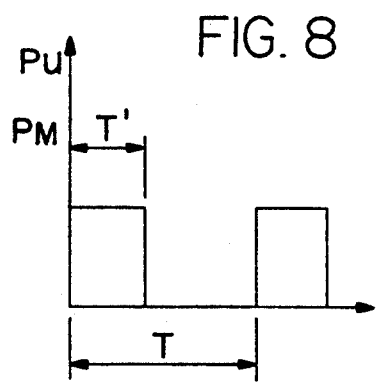
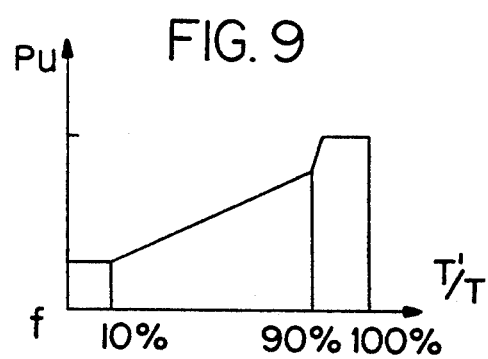
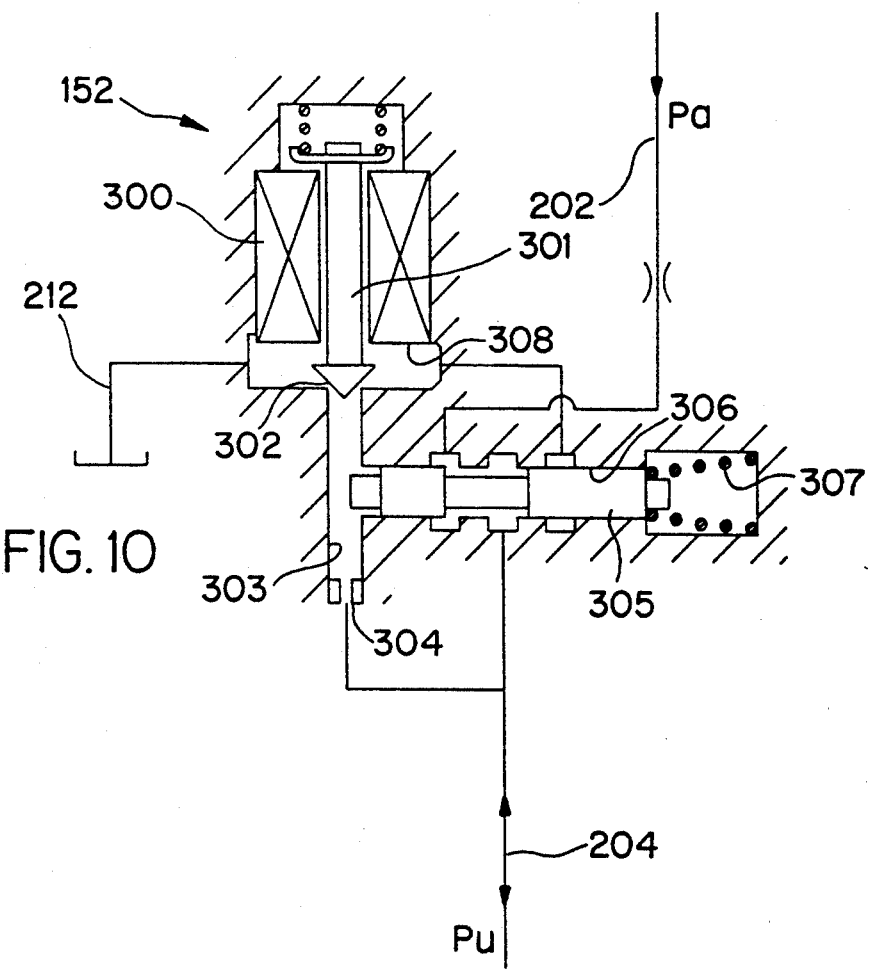

ACTUATOR WITH WEAR COMPENSATING CHAMBER

FIELD OF THE INVENTION

The present invention relates to an actuator for controlling a friction clutch having a diaphragm, in particular for motor vehicles, in which the state of the clutch is changeable between a "clutch engaged" position and a "declutched" position by means of the actuator acting on a linkage which itself controls the declutching mechanism of the clutch, the actuator being of the kind which includes coupling means in two parts, one of which is associated with the linkage and the other with the actuator proper.

BACKGROUND OF THE INVENTION

Such an actuator is described in the specification of U.S. Pat. No. 4 671 400, and enables the clutch not only to be motorised, but also to operate utterly reliably, regardless of the state of wear of the friction liners of the clutch. At the same time it affords a very simple construction with minimum movement of the various maneuvering means of the clutch. The coupling means are part of a wear compensating arrangement to which the above-mentioned two-part coupling means are especially applicable. The two parts of the coupling means are normally snap-fitted to each other. This arrangement does give satisfaction, but it does not enable continuous wear compensation to be obtained.

When the maneuvering means or actuators are of the fluid operated type and include a main piston and a main cylinder, together defining a control chamber, the arrangement mentioned above is difficult to fit within the actuator itself.

In addition, the displacement of the linkage and therefore of the diaphragm, is then a function of the hydraulic or pneumatic fluid pressure prevailing in the control chamber. This is disadvantageous in the context of a clutch having a diaphragm with a characteristic curve of "saddlebacked" shape, i.e. showing a maximum of declutching force followed by a decrease. Thus there may be more than one clutch position corresponding to a given fluid pressure, so that the clutch is not actuated in a bi-uniform manner. Bi-uniform operation of the clutch is however desirable—that is to say, for a given fluid control pressure, there will be only one definite clutch position.

DISCUSSION OF THE INVENTION

An object of the present invention is to overcome the above mentioned disadvantages, and to provide, within the context of a fluid actuator, a novel wear compensator mounted within the actuator and acting continuously, while at the same time taking advantage of this wear compensator in order to obtain bi-uniform clutch operation.

In accordance with the invention, there is provided an actuator for controlling a friction clutch having a diaphragm, in particular for a motor vehicle, in which the state of the clutch is changeable between a "clutch engaged" position and a "declutched" position by means of the actuator actuating a linkage which is adapted to act on the declutching mechanism of the clutch, the actuator being of the kind comprising coupling means in two parts, with one of said parts being associated with the linkage and the other one of the said parts being associated with the actuator itself, wherein the said actuator is of the fluid type and includes a main piston and a main cylinder defining a control chamber, while the coupling means are in the form of a cooperating cylinder and piston defining a wear compensating chamber, with the said first part of the coupling means comprising a secondary piston which is connected to the said linkage, while the said second part of the coupling means comprises a cylinder constituting the said main piston of the actuator, and wherein the main piston carries a shut-off valve which is adapted to establish communication between the control chamber and the wear compensating chamber when the clutch (10) is in the "clutch engaged" position, characterised in that the said fluid actuator carries resilient booster means associated with the diaphragm, with loose coupled driving means being interposed between the said resilient booster means and the movable sub-assembly comprising the main piston and the secondary piston.

The term "booster means" is used in this specification and in the claims to signify a means which modifies the characteristic curve of the clutch diaphragm in such a way that, in the part of the curve where the gradient would normally be negative due to the "saddleback" effect mentioned above, the gradient remains positive, so that there is only one point on the curve, and therefore only one diaphragm and clutch position, corresponding to each value of the control fluid pressure.

The invention enables continuous wear compensation to take place, and the arrangement is also able to be made extremely compact since the secondary piston is mounted inside the main piston. In addition, the travel of the secondary piston of the actuator is minimal, having regard to the wear compensator and the load exerted by the resilient booster means in combination with the loose coupled driving means, so that the characteristic curve is constantly increasing regardless of the degree of wear. The loose coupled driving means operate by taking up a predetermined clearance corresponding to a predetermined free travel of the driving means, before the booster means begins to operate to modify the force applied to the diaphragm via the said linkage. This clearance, and the dimensions of the booster means, are chosen accordingly.

The arrangement according to the invention opens up a number of major possibilities, especially when the actuator includes a solenoid valve which is programmed for carrying out the operations of engaging and disengaging the clutch by actuating the main piston, with the shut-off valve controlling the force applied to the actuator. The invention then ensures that there will be only one position or attitude of the linkage for a given applied force.

According to another feature of the invention, resilient return means are provided in combination with a stop element carried by the main cylinder, and this enables the shut-off valve to be opened with complete certainty in the "clutch engaged" position. These resilient return means are substantially lighter than the resilient booster means, and may be mounted in series or in parallel with the latter.

In accordance with a further feature of the invention, the said loose coupled driving means comprise a transfer member which is driven in straight line movement by the main piston, the sub-assembly that comprises the main piston and the secondary piston being adapted to actuate the resilient booster means after a predetermined travel.

In one embodiment of the invention, the transfer member serves as an abutment for the resilient booster means, and carries a stop surface so that the booster means and return means are then arranged effectively in series. In another embodiment, the transfer member serves as a stop or abutment for the resilient return means, while the abutment member (which may be integral with the transfer member) acts as a stop surface for the resilient booster means, which are in consequence then arranged to act in parallel with the return means.

It will be appreciated that in every case, the resilient booster means can exert a minimal load on the diaphragm, due to the wear compensator and to the loose coupled driving means provided in accordance with the invention.

Preferred embodiments of the invention will now be described, by way of example only and with reference to the accompanying drawings.

BRIEF DESCRIPTION OF THE DRAWINGS

FIG. 8 is the characteristic curve for the solenoid valve pressure, shown as a function of the opening period of the solenoid valve.

FIG. 9 is the characteristic curve of the pressure in the control fluid delivered by the solenoid valve, as a function of the cyclic control ratio of the valve.

FIG. 10 is a diagrammatic view of the solenoid valve itself.

DESCRIPTION OF PREFERRED EMBODIMENTS OF THE INVENTION

Figure 1:
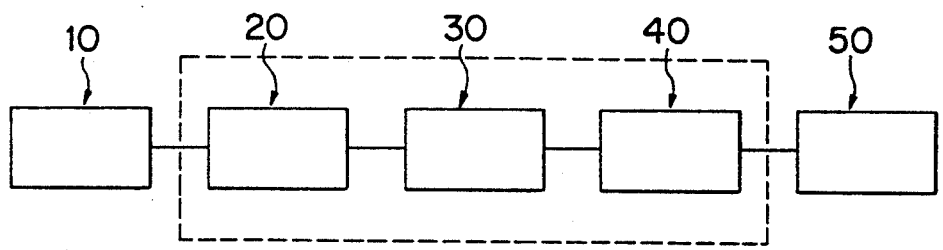
FIG. 1 is a schematic diagram of the clutch control system.

As shown in the drawings, and in particular in FIG. 1, the control system for a friction clutch 10 of a motor vehicle comprises a hydraulic circuit 50, a pressure source 40, a fluid control module or fluid actuator 30, and a linkage 20 which is arranged to act on the declutching means 7 of the clutch 10.

More precisely, the clutch 10 in this example comprises a reaction plate 3 which is secured to the crankshaft 1 of the engine M of the vehicle, for rotation with the crankshaft, together with a pressure plate 5, a cover plate 6 and a diaphragm 7, the last mentioned being the declutching means referred to above. The cover plate 6 is arranged to be secured, by means of screws (not shown), to the reaction plate 3, and is also secured to the pressure plate 5 for rotation with the latter. The cover plate 6 is arranged to be movable axially with respect to the pressure plate 5, for example by means of tangential tongues, or in a modification a coupling of the tenon and mortice type.

Figure 3:
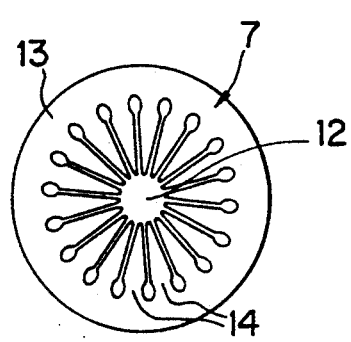
FIG. 3 is a view of a diaphragm, seen in elevation.

The diaphragm 7 bears on the cover plate 6 and biasses the pressure plate 5 towards the reaction plate 3, so that the friction pads of a clutch friction wheel 4 can be gripped between the pressure and reaction plates. The clutch friction wheel 4 is secured to the input shaft 2 of the gearbox BV for rotation with it. The diaphragm 7 comprises a peripheral portion 13 in the form of a Belleville ring, which is extended radially inwardly in a plurality of radial fingers 14 (see FIG. 3), separated by slots 11 which terminate in a central opening 12 of the diaphragm. A clutch release bearing 8, which is part of the linkage 20, is arranged to act on the ends of the fingers 14. In this example the linkage 20 comprises a push rod 21 which is pivoted on the upper end of the declutching fork 22, which is itself pivoted on the clutch housing so as to act at its inner end on the clutch release bearing 8.

Figure 4:
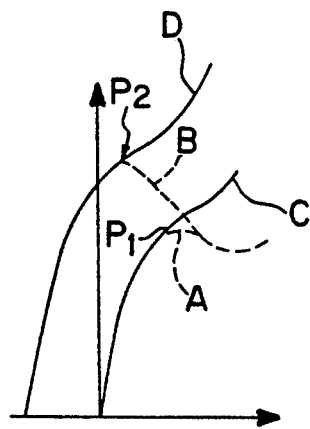
FIG. 4 is a diagram showing the characteristic curves of the forces exerted by the clutch release bearing on the diaphragm, shown as a function of the travel of the clutch during declutching.

The characteristic curve of the diaphragm 7, and thus that prevailing in the region of the clutch release bearing 8, has a maximum as can be seen in curves A and B in broken lines in FIG. 4. Normally, when the clutch is in the engaged position, the friction liners of the clutch friction wheel 4 are gripped between the pressure plate 5 and the reaction plate 3 for transmitting movement from the driving shaft 1 to the driven shaft 2. In order to disengage the clutch, it is merely necessary to exert a thrust on the ends of the diaphragm fingers 14, so as to cause the diaphragm to pivot in such a way as to release the friction liners, so that the clutch wheel 4 is then in the disengaged position.

The arrangement may be of the "push to release" type, and in that case the clutch release bearing acts in a thrust mode on the diaphragm 7, which is mounted so as to tilt with respect to the cover plate 6. Alternatively the arrangement may be of the "pull to release" type, in which case the clutch release bearing acts in a tractive mode on the diaphragm 7. The latter then bears on the cover plate 6 through its outer periphery.

In the present example, the actuator 30 is of the electrohydraulic type, for the automatic actuation of the clutch. The actuator comprises a solenoid valve 52 (FIG. 5), which is connected to a data processing and control unit 60, FIG. 2. This control unit 60, which is here in the form of an electronic computer, receives information from appropriate sensors, for example a sensor 61 (FIG. 1) for the rotational velocity of the driving shaft 1, a sensor 62 for the rotational velocity of the driven shaft 2, a sensor for detecting the position of the accelerator pedal, another sensor which detects the position of the butterfly valve in the carburettor, another sensor which detects the gear ratio that is engaged in the gearbox, and finally a sensor associated with the gear change lever.

From the information received from the various sensors listed above, the computer of the unit 60, which is of course programmed accordingly, transmits a control signal to the solenoid valve 52 so as to cause the pressure in the control chamber 73 of the actuator 30 to be varied accordingly. The actuator 30 constitutes the clutch actuating means and also includes a main cylinder 35 and a main piston 36 defining the control chamber 73. In this example, under the control of the computer 60 the actuator 30 automatically operates the linkage 20 in order to change the state of the clutch 10 from its "clutch engaged" position to its "declutched" or clutch disengaged position, and vice versa.

A wear compensator is provided within the actuator 30, and comprises coupling means 36, 72, 38. This coupling means is in two parts, one of which is associated with the linkage 20 while the other is associated with the actuator 30 itself. More specifically, the main piston 36 is formed with a cylindrical bore in which a secondary piston 38 is movable, to define between them, and within the bore of the piston 36, a wear compensating chamber 72.

The first of the two parts of the coupling means mentioned above, associated with the linkage 20, comprises the secondary piston 38, which is connected to the push rod 21 of the latter, together with the bore of the piston 36 with its chamber 72. The second part of the coupling means (associated with the actuator 30 proper) consists of the main piston 36 itself. The main piston 36 carries a shut-off off valve 39 (here in the form of a poppet valve) for bringing the control chamber 73 and the wear compensating chamber 72 into communication with each other when the clutch is in its engaged position.

Figure 5:
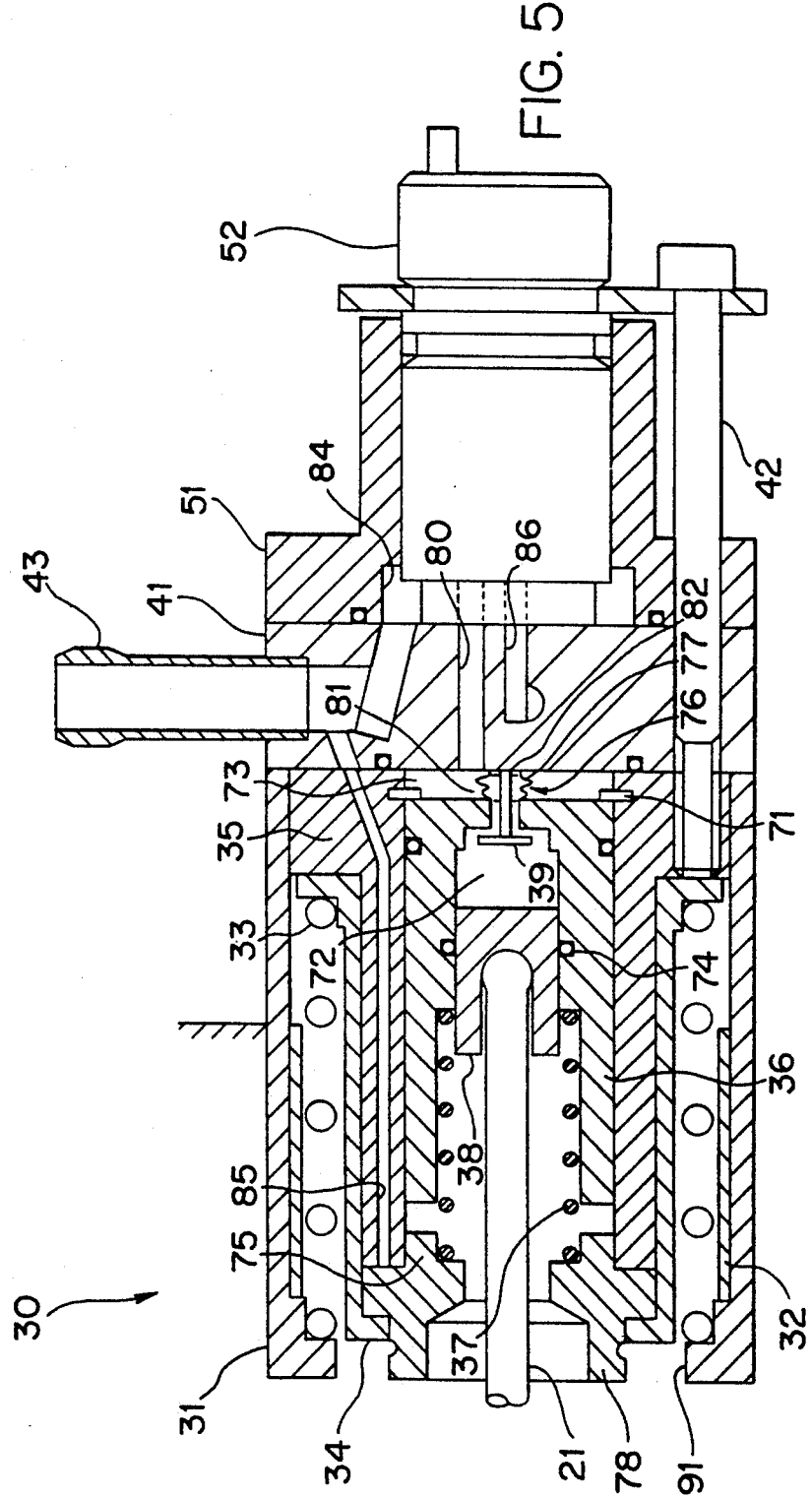
FIG. 5 is a view in axial cross section of the fluid actuating means having a wear compensator in accordance with the invention.

The actuator 30 also includes resilient booster means 33, FIG. 5, associated with the diaphragm for eliminating the reversal of the gradient of the characteristic curves shown in FIG. 4. These resilient booster means are associated with the diaphragm, with loose coupled driving means operatively connected between the booster means 33 and the piston sub-assembly that comprises the main piston 36 and the secondary piston 38.

Figure 2:
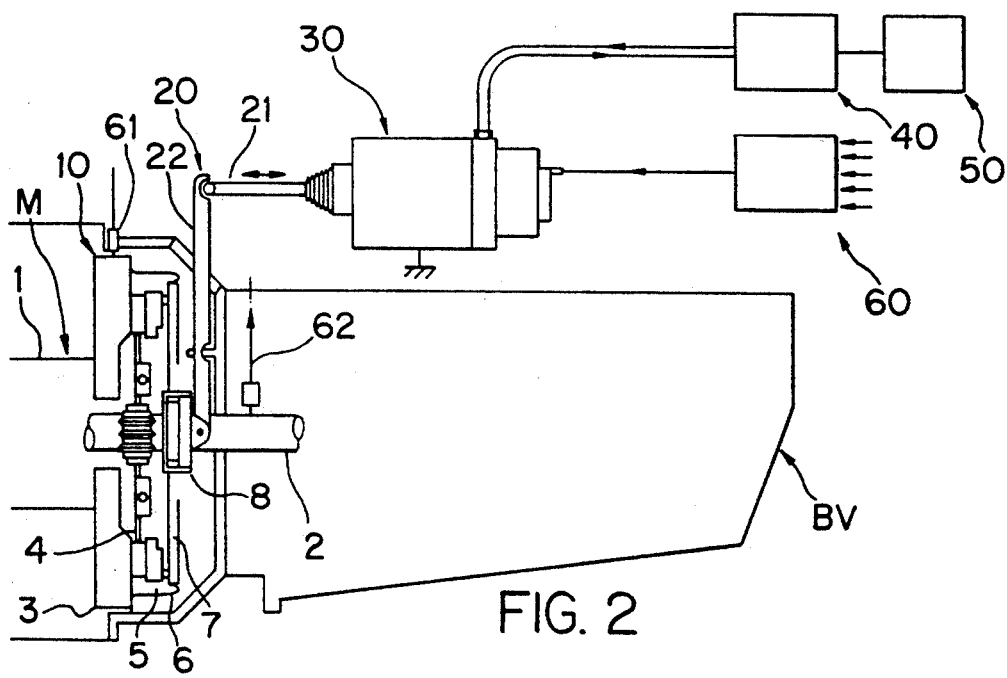
FIG. 2 is a diagrammatic view of the clutch, with its control system arranged according to the diagram of FIG. 1.

In the present example, the pistons 36 and 38 are annular, and the cylinder 35 is an annular sleeve member. The actuator 30 as a whole is generally cylindrical. The secondary piston 38 has a blind hole having a hemispherical base for receiving the push rod 21 coupled to the declutching fork 22 (FIG. 2). The secondary piston 38 is thus coupled to the push rod 21 of the linkage 20.

The actuator 30 includes a fixed body comprising components 31, 35, 41 and 51, which will be described below and which are arranged to be secured to a fixed part of the vehicle. Suitable seals are also provided, shown shaded in FIG. 5 with one of them indicated by the reference numeral 74.

The actuator 30 will now be described in greater detail. The main cylinder 35 carries a generally cylindrical sliding thrust member 78 in its leading end, while an end stop ring 71 is fitted in the bore of the cylinder 35 close to its other (rear) end. In this example, this end stop ring 71 comprises a circlip, fitted in a groove formed in the bore of the cylinder close to the base of the latter, closing the bore. This base, which is indicated at 41, will be described more fully later in this description. Resilient return means 37 are arranged to bear on the sliding thrust member 78 and on the main piston 36, so as to bias the latter towards the end stop ring 71. As can be seen, the effect of this is to open the poppet valve 39 in the "clutch engaged" position. The return means 37 comprise, in this example, a coil spring mounted in the bore of the piston 36 and centred by an integral axial spigot of the thrust member 78. The spigot 75 fits in the bore of the main cylinder 35, thus centring the latter as well.

In the present embodiment the bore of the main piston 36 is stepped. As can be seen in FIG. 5, this bore consists of three sections, of reducing diameter from its outer or left hand end. The bore section having the greatest diameter is that which houses the return spring 37, with the end of the latter remote from the end which is housed within the centering spigot 75 bearing against a radial shoulder defined between this first bore section of the main piston 36 and the next section, of smaller diameter, in which the secondary piston 38 is sealingly fitted. The sliding thrust member 78 is mounted so that it can slide with respect to the main cylinder 35. With this in view the thrust member 78 is fitted within an annular transfer member 34 which is slidingly fitted around the outer periphery of the annular main cylinder 35, on which it is thus supported. The cylinder 35 has an end portion or flange extending radially and secured by means of studs 42 to the member 41, already mentioned, which consists of a supply manifold; and is also secured through the manifold 41 to a receptacle member 51. The studs 42 thus secure all three of these components 35, 41, 51 together.

As can be seen in FIG. 5, the supply manifold 41 serves as the base member closing the right hand end of the main cylinder 35. The manifold 41 contains ducts for supplying control fluid to the control chamber 73 and for return of the fluid to a sump or reservoir, via a return branch pipe 43 extending radially from the supply manifold 41. One of these ducts is an inlet duct 86 associated with a solenoid valve 52 which is mounted within the receptacle member 51.

The valve 52 is arranged to bring the inlet duct 86 into communication with a supply duct 80, extending through the supply manifold 41 for supplying control fluid under pressure to the control chamber 73. The valve 52 is a three-stage valve of a known kind, including a core of ferro-magnetic material surrounded by an electric winding so as to constitute a solenoid which is itself connected to the computer 60 (FIG. 2). The solenoid winding is surrounded by a sleeve of magnetic material. A valve member is displaceable under the influence of the magnetic field in the solenoid so as to cover a valve seating that brings the fluid inlet duct 86 into communication with the inlet duct 80. The solenoid valve 52 also includes, in its interior, a transfer duct, which is not shown in FIG. 5 but which can be seen in FIG. 10 at 303. This transfer duct enables control fluid to return to the above mentioned sump via a peripheral drain duct 84 formed in the receptacle member 51 and connected to the return pipe branch 43 through ducting formed in the supply manifold 41.

In this example, the control fluid is a hydraulic fluid drawn from a hydraulic power assistance system for the steering system of the vehicle, via a hydraulic servo unit constituting the pressure source 40 that supplies the actuator 30. It is of course possible, instead of using the power assisted steering system as the hydraulic source, to use a source that is specific to the clutch. Whichever of these arrangements is adopted, the solenoid valve 52 is, in this example, a proportional type solenoid valve acting as a throttle or pressure reducing valve which regulates the working pressure in proportion to the control current supplied by the computer 60. The valve operates by force control, that is to say that a given applied force corresponds to a particular position of the secondary piston 38 and linkage 20.

It will be understood that the control fluid need not be a hydraulic fluid but may instead be compressed air, in which case references in this specification to a hydraulic system are to be read as being references to a pneumatic system.

It will be noted that the solenoid valve 52 is in this example positioned close to the declutching fork 22, FIG. 2, in order to limit the response time and to facilitate adaptation to any vehicle.

The flange or widened end portion of the main cylinder 35 abuts at one side axially on the supply manifold 41, while at its other side (the left hand side as seen in FIG. 5) it acts as a shoulder against which the tubular transfer member 34 abuts. The transfer member 34 has a flange extending radially outwardly at each end. The flange at its right hand end as seen in FIG. 5 engages on the shoulder of the flange of the cylinder 35, while the flange at the outer or left hand end of the member 34 is directed radially inwardly for engagement as shown with the sliding thrust member 78. This flange is bent over in order to engage the latter.

The resilient booster means 33, referred to earlier in this description, bear firstly on the radial flange of the transfer member 34 which engages the base of the main cylinder 35, and secondly on an inwardly facing radial shoulder 91 formed on an inturned end flange of a tubular outer sleeve 31 which is fitted to, and surrounds, the base of the main cylinder 35, and which is therefore fixed with respect to both the supply manifold 41 and the receptacle member 51. The booster means 33 are therefore carried by the actuator 30 within its outer sleeve 31, and the booster means 33 are arranged in coaxial surrounding relationship with the return spring 37. In the present example the booster means 33 are in the form of a simple coil spring, while the flange of the tubular outer sleeve 31 that carries the radial shoulder 91 is at the front end of the sleeve 31. An inner sleeve 32 is force fitted in the bore of the outer sleeve 31, to define a bearing surface.

The resilient booster means 33 may of course, in a modification, consist of a plurality of Belleville rings. Whatever its actual form, the purpose for which this spring is provided is to apply a force to the bearing surface which initially increases up to the maximum P1 or P2 of the curves shown in FIG. 4, followed by a force which increases slightly. This spring thus has a variable action, and it is for this reason that the thrust member 78 is provided with its centring spigot 75. The latter defines a course of free travel through the distance that initially separates the spigot 75 from the leading or free end of the main piston 36.

The main piston 36, in combination with the secondary piston 38, the sliding thrust member 78 and the transfer member 34, form the loose coupled driving means mentioned earlier in this description as being operatively arranged between the booster means 33 and the sub-assembly of the main and secondary pistons 36 and 38. The transfer member 34 is driven in axial movement by the main piston 35, so as to actuate the booster spring 33 after the two pistons in combination have been displaced through the predetermined course of travel mentioned above. Referring once again to FIG. 4, the curve A in broken lines is the characteristic curve of the displacement of the clutch friction wheel 4 (FIG. 2) and therefore that of the diaphragm 7, when the clutch pads are new. The curve B, also in broken lines, is the corresponding characteristic when the clutch pads are worn. The ordinate shows the force applied to the diaphragm and the abscissa shows the displacement of the clutch release bearing.

As can also be seen in FIG. 4, the resilient booster means 33 alter the curves A and B to give the curves C and D respectively, shown in full lines, in which there is now no reversal of the gradient beyond the respective points P1 and P2 where the load is at a maximum. The characteristic control curve of the clutch is thus bi-uniform, with each value of control fluid pressure and applied force corresponding to only a single axial position of the clutch release bearing 8.

In selecting the appropriate clearance between the main piston 36 and the sliding thrust member 78, and in selecting the load to be exerted by the spring 33, the latter is of course arranged to act at the point P1 or P2 in such a way that the characteristic curve always has a positive gradient regardless of the state of wear of the friction liners carried by the clutch friction wheel 4.

In this example, the shut-off valve 39 has a valve member carrying a valve head for cooperation with a valve seat carried by the end wall of the main piston 36, i.e., as can be seen in FIG. 5, on the face of the latter which faces into the wear compensating chamber 72, together with a stem 82 which passes through a hole 81 which is formed for this purpose in the piston end wall. On the opposite side of the latter from the valve head, the stem 82 carries a shallow cup element 77 on which a second resilient return means 76 acts. The return means 76 bears on the outer or right hand face of the base of the piston 36 and on the cup element 77, with the latter bearing against the end face of the supply manifold 41.

It will be noted that a control fluid escape duct 85 is formed in the main cylinder 35, this duct being connected through a radial port with the internal bore of the cylinder 35. This port can clearly be seen in FIG. 5 in an axial position corresponding to the free space which exists in the rest position between the central spigot 75 of the sliding thrust member 78 and the open end of the main piston 36.

When the clutch is engaged, the main piston 36 is in abutment on the end stop ring 71, with the valve 39 being held open under the action of the return springs 37 so that its valve stem 82 bears through the cup element 77 on the end face of the supply manifold 41. The position of the end stop ring 71 is of course selected accordingly, i.e. so as to ensure that the valve 39 is open in this condition. The wear compensating chamber 72 and the control chamber 73 are then at atmospheric pressure, and this allows the secondary wear compensating piston 38 to force hydraulic oil from the chamber 72 to the chamber 73 and back to the sump, in proportion to the wear that has taken place in the clutch pads carried by the clutch friction wheel 4, FIG. 2 (bearing in mind that as the friction pads wear, the pressure plate 5 moves closer to the cover plate 6 of the clutch). In a modification, a residual pressure may exist so that the clutch release bearing 8 continues to exert a force on the clutch diaphragm 7.

At the beginning of the declutching operation, the valve member 39 is open, and the control pressure is simultaneously established in the chambers 72 and 73. In response to this, the main piston 36 is displaced so as to cause the valve 39 to close automatically, thus isolating the two chambers 72 and 73. Having regard to the fact that the force applied to the linkage 20 by the pistons 36 and 38 is equal, and taking account of the cross sectional area of the secondary piston 38, the pressure prevailing in the control chamber 73 is a multiple of that prevailing in the wear compensating chamber 72. This has the effect of preventing any accidental opening of the valve 39.

During the declutching operation, the pressure in the control chamber 73 varies in response to the action of the solenoid valve 52. In a first stage of this operation, the main piston 36 is displaced against the force exerted by the return spring 37, until it comes into abutment against the spigot 75. The spring 33, which is (in this embodiment) effectively in series with the return spring 37, is slightly compressed, due to the fact that its stiffness is selected so as to be greater than that of the spring 37. After the main piston has come into abutment against the spigot 75, the latter is driven to the left, so that the thrust member 78 draws the transfer member 34 outwardly (to the left in FIG. 5), thus compressing the booster spring 33 until the collar at the right hand end of the transfer member 34, adjacent to the base of the main cylinder 35, comes into axial abutting contact with the right hand end of the inner sleeve 32.

The internal diameter of the end flange (carrying the radial shoulder 91) of the tubular outer sleeve 31 is of course so selected that the transfer member 34 is able to be displaced without interfering with this end flange. In addition, as will be understood, the characteristics of the springs 37 and 33 will be selected depending on the particular application, and different ways may be resorted to for passing from the "clutch engaged" position to the declutched position and vice versa, for which purpose the computer 60 can be programmed so as to deliver the appropriate current to the solenoid valve 52.

The axial distance between the spigot 75 and the main piston 36 also depends on the application, and in particular on the characteristic of the diaphragm 7, so that the spring 33 will exert its differential action and so that the loose coupled driving means can be suitably defined. In every case it will be appreciated that the actuator 30 is extremely compact axially, due mainly to the provision of the transfer member 34.

The present invention is of course not limited to the particular embodiment described above. In particular, instead of a valve 39 in the form of a poppet valve, a flap type valve may be used, such as to cooperate with a rod passing through the base wall of the main piston 36 and being fixed to the supply manifold 41.

Figure 6:
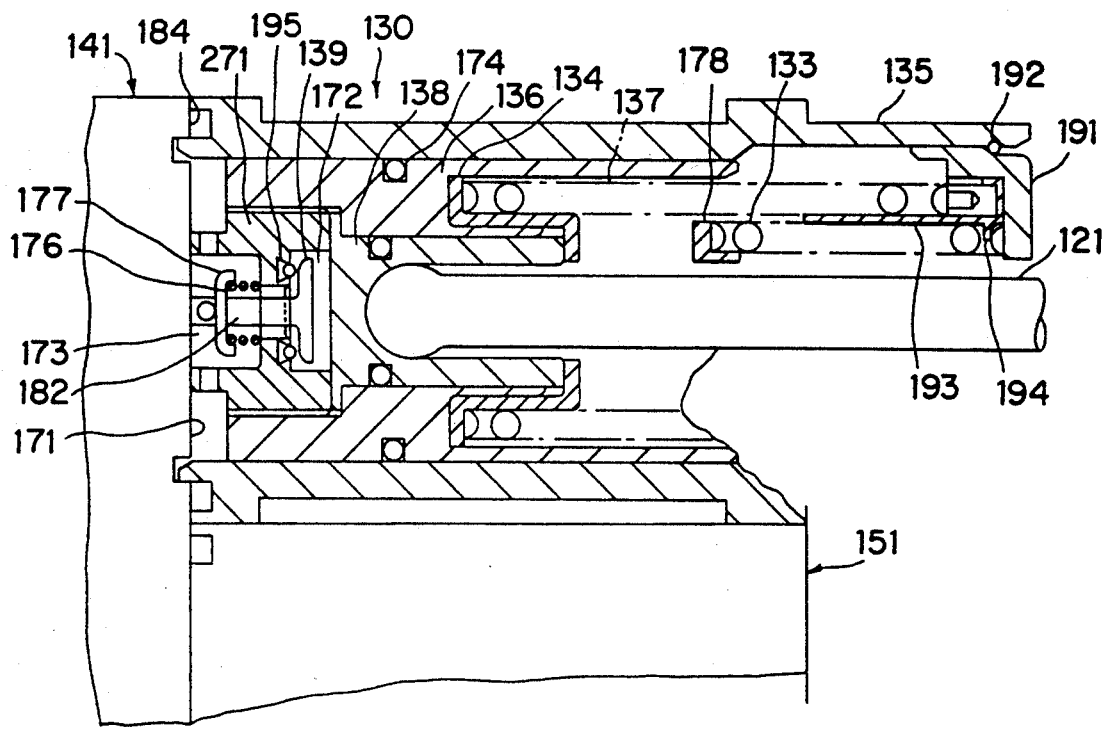
FIG. 6 is a view similar to FIG. 5, showing a second embodiment of the invention.

Reference is now made to FIG. 6, showing part of the actuator in one modified embodiment. In FIG. 6, the outer sleeve and the main cylinder are combined in a single component. Those elements in FIG. 6 which are common to those shown in FIG. 5 carry the same reference numerals but increased by 100. In this example, the main piston 136 is hollow, and carries the transfer member 134 on which the resilient return means 137 are engaged. The latter, in the form of a coil spring, surrounds the resilient booster means 133 and bears at its other end on a shoulder 191 (which is in a fixed axial position with respect to the main cylinder 135) through a split ring 192 which is engaged in a groove in the main cylinder 135. This shoulder 191 carries a member 193 which has an anchor tab 194 for anchoring in position the corresponding end of the resilient means 133, which are again in the form of a coil spring.

As will be seen from FIG. 6, the springs 133 and 137 are here arranged effectively in parallel with each other, with the combination of the secondary piston 138 and main piston 136 being arranged to come into contact with the thrust member 178 with the transfer member 134 interposed, at the end of an axial displacement movement which is predetermined as a function of the points P1 and P2 in FIG. 4, thus defining the loose coupled driving means of the actuator. The transfer member 134 is driven in straight line axial movement by the main piston 136 so as to actuate the resilient booster means after a predetermined travel.

A member 271 is secured (by threaded fastening in this example) on the main piston 136, so as to delimit the control chamber 173 and the wear compensating chamber 172. The member 271 is of generally H-shaped cross section. The central part of this "H" is perforated to allow the stem 138 of the valve member 139 to pass through it. The valve member 139 is arranged to come sealingly into engagement against a valve seat 195 which is formed on a ring carried in a groove in the central part of the "H" of the member 271. The latter thus constitutes the base of the piston 136. The end of this piston base member 271 is arranged to cooperate, in the "clutch engaged" position, with the base of the main cylinder 138 which is represented by the manifold body 141. The end stop, 171, which in the actuator of FIG. 5 was represented by the end stop ring 71, consists of the end face of the manifold body 141 and is thus carried by the main cylinder 135. It will be noted that the piston base member 271 is formed with four holes for bringing the control chamber 173 into communication with the drain 174 for returning the control fluid to the sump when the actuator is not in the "clutch engaged" position and after a certain amount of travel has been performed. A supply passage, not shown, is also provided. The cup element 177 is carried by the valve stem 182, but is here spaced slightly from the free end of the latter for mounting the valve return spring 176.

The arrangement shown in FIG. 6 operates in the same way as that described above with relation to FIG. 5. However, it will be noted that the receptacle member 151 for the solenoid valve 152 is arranged side by side with the main cylinder 135, being on the same side of the manifold body 141 as the latter so that the actuator is generally of stirrup-shaped construction.

The solenoid valve 152 is shown in FIG. 10. It is of the plunger type having a control solenoid 300, which is powered by the computer 60 of FIG. 2 in accordance with a cyclic ratio in which a plunger 301 is displaced from an open position to a closed position in response to this cyclic ratio. In FIG. 10, the plunger 301 is arranged to cooperate with a seating 302. The transfer duct 303 previously mentioned terminates in the seating 302 and communicates with a return duct 212 (see FIG. 7) for returning the fluid to the sump or reservoir. The transfer duct 303 is provided with a restriction or orifice 304, through which it is connected to an operating duct 204 which is supplied at a pressure Pu.

The solenoid valve 152 also includes a valve member 305 which is mounted in a bore 306. The valve member 305 is loaded by a spring 307 so as to close off the transfer duct 303. The bore 306 is formed with three grooves which are connected, respectively, with an input duct 202 (at a pressure Pa), the operating duct 204, and the return duct 212, the latter via a groove 308 delimited by the valve seat 302. The valve member 305 has a central portion with a reduced diameter, between terminal portions for covering and uncovering the annular grooves in the bore 306 according to the position of the valve member. In addition, the valve member has, at its free end, a nose portion which can move with the valve member across the duct 303 so as to vary the effective cross section of the latter.

Referring to FIG. 8, the solenoid plunger 301 is open for a period of time T' in an overall period T. The value of the characteristic curve of the working pressure is obtained as a function of the cyclic ratio (T'/T), in accordance with the curve shown in FIG. 9.

Figure 7:
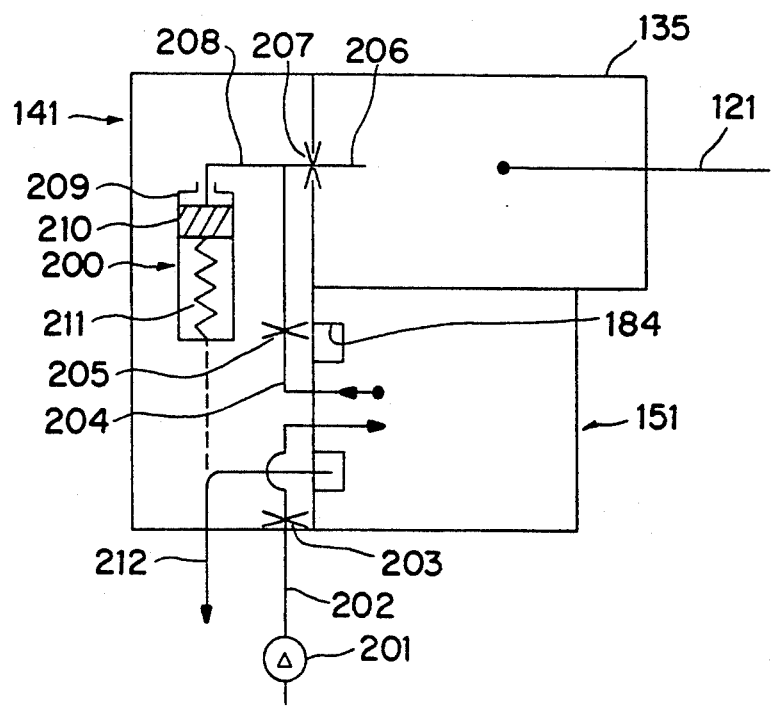
FIG. 7 is a diagrammatic view of the actuator in this second embodiment.

Referring now to FIG. 7, the configuration of the manifold body 141 (FIG. 6) is here used to advantage in order to incorporate within it a vibration damper 200. More precisely, the hydraulic circuit includes a pump 201 which feeds the input duct 202 for the solenoid valve 152. The latter is not shown in FIG. 7, but its housing 151 is indicated. The control fluid leaves the outlet of the solenoid valve 152 through the operating duct 204, which itself divides into a control chamber feed duct 206 leading into the control chamber 173, and a further duct 206 which leads into a cylinder 209. The latter contains a piston 210, which is loaded by a spring 201 bearing on the base of the cylinder 209. The base of the cylinder 209 communicates with the return duct 212 through which the fluid is returned to the sump. Three flow restrictors 203, 205 and 207 are provided in the ducts 202, 204 and 206 respectively. Thus, the flow restrictor 207 is connected to the control chamber 173, and the same is true of the feed duct 208 for the cylinder 209, the duct 208 being connected to the chamber 173 through the flow restrictor 207.

The vibration damper 200 comprises the cylinder 209 with its piston 210 and spring 211. Vibrations due to the axial movement of the plunger of the solenoid valve 152 are filtered out by means of the apparatus just described. This has the advantage of enabling noise to be eliminated in the region of the clutch release bearing 8 (FIG. 2). This noise is caused by vibrations in the linkage 20, and more particularly in the push rod 121 (FIGS. 6 and 7) connected to the secondary piston 138, which will vibrate in the absence of the damper 200 and, in particular, in the absence of the flow restrictor 207. The force applied by the spring 211 and piston 210 is of course selected accordingly.

Figure 11:
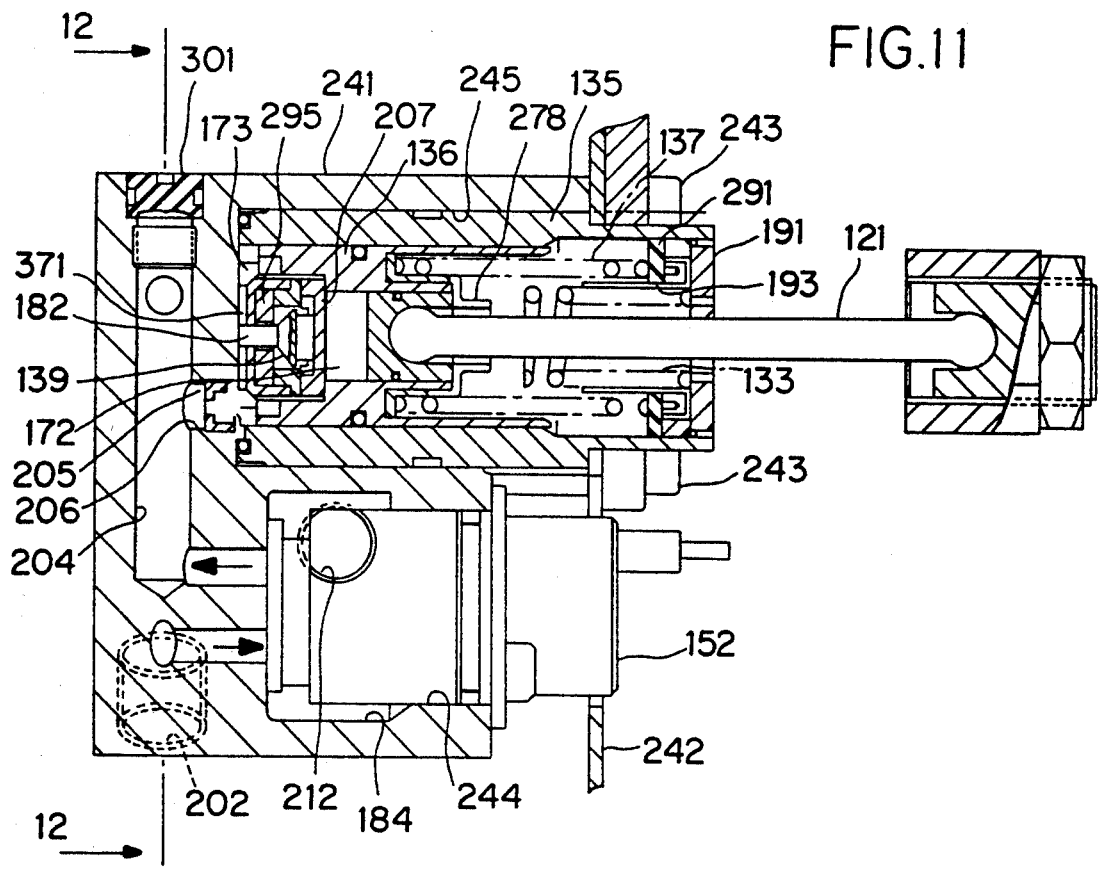
FIG. 11 is a diagrammatic view in cross section, showing the actuator in a third embodiment of the invention.
Figure 12:
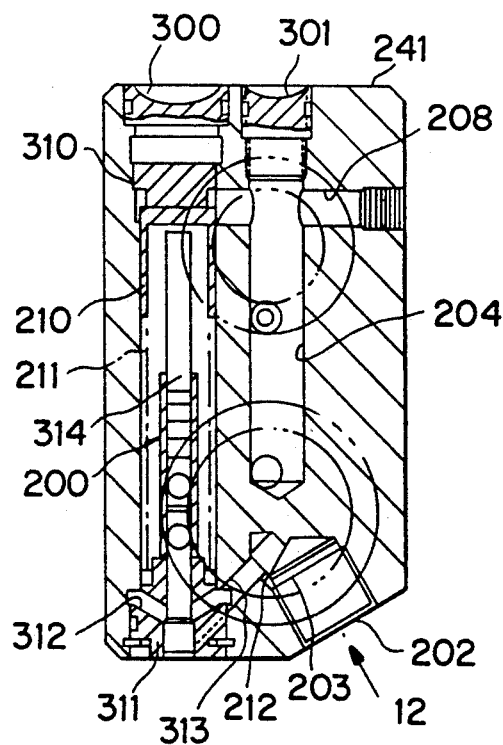
FIG. 12 is a view in cross section taken on the line 12—12 in FIG. 11.

Reference is now made to FIGS. 11 and 12 showing a third embodiment of the actuator. In these Figures, those elements that are common to those shown in FIGS. 6 and 7 are given the same reference numerals. In FIGS. 11 and 12, the supply manifold is indicated at 241, and is so shaped as to define a cylindrical chamber 245, open at one end, in which the main cylinder 135 is fitted. The main piston 136 slides in the main cylinder 135 and carries the transfer member, 234. The piston 136 is hollow for this purpose and drives the transfer member in axial movement.

The transfer member is extended axially towards the shoulder 191, and has a tubular nose 278, of frusto conical shape, which acts as the stop surface against which the booster spring 133 is arranged to come into contact. The stop nose 278 is integral with the transfer member, and actuates the booster spring 133 after having travelled through a predetermined distance. It will be noted that the return spring, which is mounted in parallel with the spring 133, bears on the shoulder 191 with a resilient abutment element 291 interposed for reducing noise generated by any impacts.

The supply manifold 241 is fixed at the free end of the cylinder 135 on a fixed support member 242, by means of studs 243. It will be noted that the cylinder 135 is shouldered, and is thus sealingly blocked between the support element 242 and the manifold body 241. The latter need not be machined with any great accuacy, since the necessary precision is obtained on the main cylinder 135 carried by it. The manifold body 241 is also formed with a further cylindrical chamber 244, parallel to the main cylinder 135, and the solenoid valve 152 is mounted, in this example by threaded fastening, sealingly in this chamber 244.

The body of the supply manifold thus serves as the body or housing for the whole of the actuator itself. It is formed as a single body member, in which the various ducts 204, 206 and 208 are formed, and in which the vibration damper 200 comprising the piston 210, cylinder 209 (FIG. 7) and spring 211, is also mounted as can be seen in FIG. 12, together with the flow restrictors 203, 205 and 207. The groove 184 is formed in the chamber 244. The various ducts and other elements are readily formed by drilling the body 241, being closed as required by sealing plugs 300 and 301. Other details will appear from a close study of FIGS. 11 and 12.

The flow restrictor 203 comprises a ring with a calibrated central orifice, while the flow restrictor 205 is immediately adjacent to the control chamber 173 and is in the form of a hollow cylindrical element, again having a calibrated central orifice. The restriction 207 is of similar form to the flow restrictor 205, being fixed to a member 371 which carries the valve member 139 and its valve seat 295. This member 371, like the corresponding piston base member 271 in FIG. 6, is screwed into the main piston 136 and traps the flow restrictor 207 in engagement against a shoulder defined on the piston 136. The flow restrictor 207 is in communication with the wear compensating chamber 172, and the return spring associated with the valve member 133 bears on the flow restrictor 207 to bias the valve member towards a member 295, of resilient material, through which the valve stem 182 extends. This member 295 acts as a seat for the valve member 139, the latter being frusto conical in shape. This arrangement provides a most satisfatory sealing effect.

The piston 210 of the vibration damper 200, FIG. 12, is mounted for movement in the cylinder 209, which is formed by vertical drilling through the base portion of the housing 241. The piston 210 is hollow, and carries an annular damping block 310 of T-shaped cross section. In this example the spring 211 is a coil spring which bears at one of its ends on the base of the piston 210, while at its other end it bears on a closure member 311 which sealingly closes the base of the cylinder 209. This closure member 311 is formed with transverse supply ducts 312 connected to a duct 313 in the body 241. The duct 313 is connected to the return duct 212. The closure member 311 is hollow in the centre, to define a central bore in which is mounted a rod 314 which bears on the piston 210. The resilient block 310 bears against the plug 300. The cylinder 209 is supplied with hydraulic fluid at the level of the base of the damping block 310, above the piston 210.

The rod 314 is displaceable with respect to the closure member 311, so that since the rod 314 engages against the base of the piston 210, the latter is subjected to a reaction force. Oscillations of the piston are thus damped, so ensuring good operation of the actuator and suppression of noises due to the presence of the block 310. The vibration damper 200 is highly effective. The shape of the housing body 241 will be noted, with its base part being formed with various drillings and with the cylindrical chambers 244 and 245 projecting axially from it. The actuator is thus extremely compact and is easy to manufacture, particularly as regards drilling operations. It will also be noted that the location of the flow restrictors 205 and 207 simplifies the construction of the actuator, the restrictor 205 being mounted in the duct 206 and the restrictor 207 between the control chamber 173 and the wear compensating chamber 172.

What is claimed is:

1. A fluid-operated actuator for controlling the movement of a motor vehicle friction clutch having a diaphragm between an engaged position and a disengaged position, through a linkage coupling the actuator to the clutch diaphragm, said actuator comprising:

a main cylinder;

a movable piston sub-assembly comprising:

a main piston mounted for movement in the main cylinder and having a cylindrical bore, said main piston and said main cylinder defining a control chamber;

a secondary piston movably mounted in said cylindrical bore to define therein a wear compensating chamber, said secondary piston adapted to be coupled to said linkage, wherein said secondary piston constitutes a coupling means for coupling said linkage to said main piston, said coupling means being in piston-and-cylinder relationship with said main piston;

wherein said actuator further comprises:

resilient booster means for resiliently applying a force to and connecting an outer sleeve with said piston sub-assembly, said outer sleeve fixed with respect to said main cylinder;

a resilient return means for applying a lighter force than the resilient booster means and engaging said piston sub-assembly;

loose coupled driving means for coupling said resilient booster means with said piston sub-assembly through said resilient return means, said loose coupled driving means being interposed between said resilient booster means and said resilient return means;

a stop element carried by the main cylinder for limiting the travel of the main piston;

a shut-off valve carried by said main piston for bringing said control chamber and said wear compensating chamber into communication with each other when said clutch is in said clutch engaged position;

whereby said return means bias said piston sub-assembly towards the stop element so as to open the shut-off valve in the engaged position of the diaphragm.

2. An actuator according to claim 1, wherein the said loose coupled driving means comprise the main piston and a member engaging the booster means, together with means defining a gap between the main piston and the transfer member, the gap being such as to define a predetermined free travel of the main piston followed by actuation of the transfer member by the main piston, so as to then actuate the booster means.

3. An actuator according to claim 2, further including a sliding thrust member carried at one end of the main cylinder, said stop element being carried in the bore of the main cylinder, with said return means being arranged to bear on said sliding thrust member and on the main piston whereby to bias the latter towards the stop element and to open the shut-off valve.

4. An actuator according to claim 3, wherein the transfer member is mounted for sliding movement on the outer periphery of the main cylinder, the said thrust member being carried by the transfer member so as itself to be mounted for sliding movement with respect to the main cylinder.

5. An actuator according to claim 2, wherein the resilient return means are mounted in parallel with the resilient booster means, the main piston being hollow and the main cylinder defining an internal shoulder, with the transfer member being carried within the hollow interior of the main piston, and with the resilient return means bearing at one of its ends on the transfer member and at its other end on said shoulder.

6. An actuator according to claim 5, wherein the resilient booster means comprise a coil spring surrounded by the resilient return means, the actuator further including a member carried by said shoulder and having an anchor tab mounting said coil spring in position.

7. An actuator according to claim 1, having a supply manifold block and including a solenoid valve, the manifold block having duct means for communication with the solenoid valve, the manifold block further constituting a base for the main cylinder, and wherein the shut-off valve includes a valve stem and means mounting the valve stem for engagement against the said base of the main cylinder.

8. An actuator according to claim 1, further comprising a supply manifold block and a solenoid valve, and means bringing the manifold block into communication with the control chamber and with the solenoid valve, the actuator further comprising a vibration damper within the manifold block, the vibration damper comprising a cylinder, a piston movable within the cylinder, and a spring bearing on the base of the cylinder and on the piston.

9. An actuator according to claim 8, further including a flow restrictor in communication with the control chamber, a first duct joining the cylinder of the vibration damper to said flow restrictor, and an operating duct connected to the solenoid valve and communicating with the flow restrictor.

* * * * *